US009013482B2

(12) United States Patent
Lim et al.

(10) Patent No.: US 9,013,482 B2
(45) Date of Patent: Apr. 21, 2015

(54) MESH GENERATING APPARATUS, METHOD AND COMPUTER-READABLE MEDIUM, AND IMAGE PROCESSING APPARATUS, METHOD AND COMPUTER-READABLE MEDIUM

(75) Inventors: Hwa Sup Lim, Hwaseong-si (KR); Yong Sun Kim, Yongin-si (KR); Seung Kyu Lee, Seoul (KR); Kee Chang Lee, Yongin-si (KR); Ouk Choi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1117 days.

(21) Appl. No.: 12/926,412

(22) Filed: Nov. 16, 2010

(65) Prior Publication Data

US 2011/0254841 A1    Oct. 20, 2011

(30) Foreign Application Priority Data

Apr. 20, 2010    (KR) .......................... 10-2010-0036226

(51) Int. Cl.
*G06T 15/40* (2011.01)
*G06T 17/20* (2006.01)

(52) U.S. Cl.
CPC ..................... *G06T 17/20* (2013.01)

(58) Field of Classification Search
CPC ......... G06T 19/00; G06T 17/20; G06T 17/00; G06T 15/00; G06T 15/10; G06T 15/40; G06T 15/20
See application file for complete search history.

(56) References Cited

U.S. PATENT DOCUMENTS

| | | | | |
|---|---|---|---|---|
| 7,212,656 | B2* | 5/2007 | Liu et al. | 382/118 |
| 8,520,931 | B2* | 8/2013 | Tateno | 382/154 |
| 2002/0063707 | A1* | 5/2002 | Kawanaka | 345/423 |
| 2002/0171666 | A1* | 11/2002 | Endo et al. | 345/619 |
| 2002/0186216 | A1* | 12/2002 | Baumberg et al. | 345/422 |
| 2006/0104491 | A1* | 5/2006 | Liu et al. | 382/118 |
| 2006/0152507 | A1* | 7/2006 | Lee et al. | 345/423 |
| 2006/0269143 | A1* | 11/2006 | Kozakaya | 382/218 |
| 2008/0063300 | A1* | 3/2008 | Porikli et al. | 382/294 |
| 2009/0067707 | A1* | 3/2009 | Sim et al. | 382/154 |
| 2009/0174710 | A1* | 7/2009 | Sim et al. | 345/420 |
| 2010/0158400 | A1* | 6/2010 | Lu et al. | 382/238 |
| 2010/0328307 | A1* | 12/2010 | Lim | 345/420 |
| 2011/0043610 | A1* | 2/2011 | Ren et al. | 348/46 |

FOREIGN PATENT DOCUMENTS

| | | |
|---|---|---|
| KR | 10-2006-0066302 | 6/2006 |
| KR | 10-2006-0081300 | 7/2006 |
| KR | 10-2006-0101223 | 9/2006 |
| KR | 10-2006-0131145 | 12/2006 |
| KR | 10-2009-0049670 | 5/2009 |
| KR | 10-2009-0091639 | 8/2009 |
| KR | 10-2010-0000671 | 1/2010 |
| KR | 10-2010-0002033 | 1/2010 |

* cited by examiner

*Primary Examiner* — Mark Zimmerman
*Assistant Examiner* — Michelle Chin
(74) *Attorney, Agent, or Firm* — NSIP Law

(57) ABSTRACT

Disclosed is a mesh generating apparatus, method and computer-readable medium, and an image processing apparatus, method and computer-readable medium. A single 3D mesh and a single 3D object model may be generated using a single color image and a single depth image. A plurality of viewpoint images seen from a plurality of viewpoints may be generated from a single 3D object model.

27 Claims, 11 Drawing Sheets

MESH GENERATING APPARATUS, METHOD AND COMPUTER-READABLE MEDIUM, AND IMAGE PROCESSING APPARATUS, METHOD AND COMPUTER-READABLE MEDIUM

CROSS-REFERENCE TO RELATED APPLICATIONS

This application claims the benefit of Korean Patent Application No. 10-2010-0036226, filed on Apr. 20, 2010, in the Korean Intellectual Property Office, the disclosure of which is incorporated herein by reference.

BACKGROUND

1. Field

Example embodiments of the following description relate to a mesh generating apparatus, method and computer-readable medium, and an image processing apparatus, method and computer-readable medium, and more particularly, to a mesh generating apparatus, method and computer-readable medium, and an image processing apparatus, method and computer-readable medium that may perform object modeling using a single color image and a single depth image.

2. Description of the Related Art

An area of an object seen from a viewpoint and represented by a depth image and a corresponding color image is different from the same area of the object seen from another viewpoint and represented by another depth image and a corresponding color image. Thus, when a viewpoint from which an object is seen is changed, a portion not shown before the viewpoint is changed may be shown. Thus, to provide a more realistic three-dimensional (3D) image, there is a demand for a depth image and a color image seen from a predetermined viewpoint between before a change and after a change in the viewpoint from which the object is seen.

SUMMARY

The foregoing and/or other aspects are achieved by providing an image processing apparatus, including a mesh generator to generate a three-dimensional (3D) mesh using two-dimensional (2D) vertexes of a color image and 3D vertexes of a depth image, and a 3D object model generator to generate a 3D object model based on the 3D mesh and the color image.

The mesh generator may include a first processor to generate 2D vertexes from the color image and to generate a 2D mesh using the generated 2D vertexes, a second processor to generate 3D vertexes from the depth image, and a 3D mesh generator to match the 2D mesh with the 3D vertexes, and to generate a 3D mesh.

The first processor may include a color feature extractor to extract a feature from the color image, a 2D vertex generator to analyze the extracted feature and to generate the 2D vertexes, and a 2D mesh generator to connect the generated 2D vertexes and to generate the 2D mesh.

The color feature extractor may extract, as the feature of the color image, at least one gradient of a gradient of a corner of the color image, and a gradient of an edge of the color image. The 2D vertex generator may set, as a 2D vertex, a pixel corresponding to a gradient that is greater than a reference value among the extracted at least one gradient.

The 2D mesh generator may connect the generated 2D vertexes and pixels having a same color system may represent a face and may generate the 2D mesh.

The second processor may include a depth feature extractor to extract a feature from the depth image, and a 3D vertex generator to analyze the extracted feature and to generate the 3D vertexes.

The depth feature extractor may extract, as the feature of the depth image, at least one gradient of a gradient of a corner of the depth image, a gradient of an edge of the depth image, and a gradient of a curvature of the depth image. The 3D vertex generator may set, as a 3D vertex, a pixel corresponding to a gradient that is greater than a reference value among the extracted at least one gradient.

The second processor may set all pixels of the depth image as the 3D vertexes.

The 3D mesh generator may add depth values of the 3D vertexes to the 2D vertexes of the 2D mesh and may generate the 3D mesh.

When the depth values of the 3D vertexes are not added to a 2D vertex among the 2D vertexes of the 2D mesh, the 3D mesh generator may interpolate a depth value to be added to the 2D vertex, using the generated 3D vertexes.

The image processing apparatus may further include an image inpainting unit to inpaint occlusion areas, the occlusion areas generated in the generated 3D object model by a change in a viewpoint of a virtual camera.

The image processing apparatus may further include a rendering unit to generate an image corresponding to a view from a viewpoint of the virtual camera using the generated 3D object model and the inpainted occlusion areas when the viewpoint of the virtual camera is selected.

The foregoing and/or other aspects are achieved by providing a mesh generating apparatus, including a first processor to generate two-dimensional (2D) vertexes from a color image, and to generate a 2D mesh using the generated 2D vertexes, a second processor to generate three-dimensional (3D) vertexes from a depth image, and a 3D mesh generator to match the 2D mesh with the 3D vertexes and to generate a 3D mesh.

The foregoing and/or other aspects are achieved by providing an image processing method, including generating, by at least one processor, a three-dimensional (3D) mesh using two-dimensional (2D) vertexes of a color image and 3D vertexes of a depth image, and generating a 3D object model based on the 3D mesh and the color image.

The generating of the 3D mesh may include generating 2D vertexes from the color image and generating a 2D mesh using the generated 2D vertexes, generating 3D vertexes from the depth image, and matching the 2D mesh with the 3D vertexes and generating a 3D mesh.

The generating of the 2D mesh may include extracting a feature from the color image, analyzing the extracted feature, and generating the 2D vertexes, and connecting the generated 2D vertexes and generating the 2D mesh.

The extracting of the feature may include extracting, as the feature of the color image, at least one gradient of a gradient of a corner of the color image, and a gradient of an edge of the color image. The generating of the 2D vertexes may include setting, as a 2D vertex, a pixel corresponding to a gradient that is greater than a reference value among the extracted at least one gradient.

The connecting of the 2D vertexes may include connecting the generated 2D vertexes causing pixels having a same color system to represent a face and generating the 2D mesh.

The generating of the 3D vertexes may include extracting a feature from the depth image, and analyzing the extracted feature and generating the 3D vertexes.

The extracting of the feature may include extracting, as the feature of the depth image, at least one gradient of a gradient of a corner of the depth image, a gradient of an edge of the depth image, and a gradient of a curvature of the depth image. The analyzing of the extracted feature may include setting, as a 3D vertex, a pixel corresponding to a gradient that is greater than a reference value among the extracted at least one gradient.

The generating of the 3D mesh may include adding depth values of the 3D vertexes to the 2D vertexes of the 2D mesh, and generating the 3D mesh.

The image processing method may further include inpainting occlusion areas, the occlusion areas generated in the generated 3D object model by a change in a viewpoint of a virtual camera.

The image processing method may further include generating an image corresponding to a view from a viewpoint of the virtual camera using the generated 3D object model and the inpainted occlusion areas, when the viewpoint of the virtual camera is selected.

The foregoing and/or other aspects are achieved by providing a mesh generating method including generating, by at least one processor, two-dimensional (2D) vertexes from a color image, and generating a 2D mesh using the generated 2D vertexes, generating, by the at least one processor, three-dimensional (3D) vertexes from a depth image, and matching, by the at least one processor, the 2D mesh with the 3D vertexes and generating a 3D mesh.

According to another aspect of one or more embodiments, there is provided at least one computer readable medium including computer readable instructions that control at least one processor to implement methods of one or more embodiments.

Additional aspects, features, and/or advantages of embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
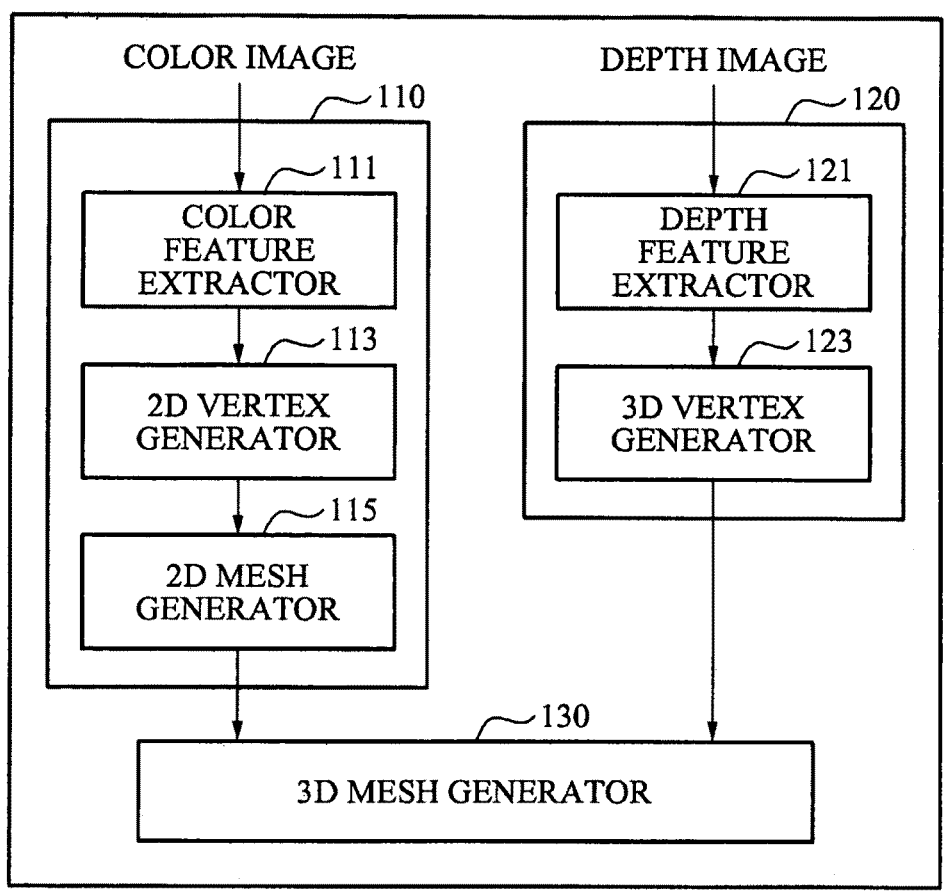
FIG. 1 illustrates a block diagram of a mesh generating apparatus according to example embodiments.

Reference will now be made in detail to embodiments, examples of which are illustrated in the accompanying drawings, wherein like reference numerals refer to like elements throughout. Embodiments are described below to explain the present disclosure by referring to the figures.

FIG. 1 illustrates a block diagram of a mesh generating apparatus 100 according to example embodiments.

Referring to FIG. 1, the mesh generating apparatus 100 includes a first processor 110, a second processor 120, and a three-dimensional (3D) mesh generator 130.

The first processor 110 may generate two-dimensional (2D) vertexes from an input color image, and may generate a 2D mesh using the generated 2D vertexes. To generate the 2D vertexes and the 2D mesh, the first processor 110 may include a color feature extractor 111, a 2D vertex generator 113, and a 2D mesh generator 115.

Figure 2:
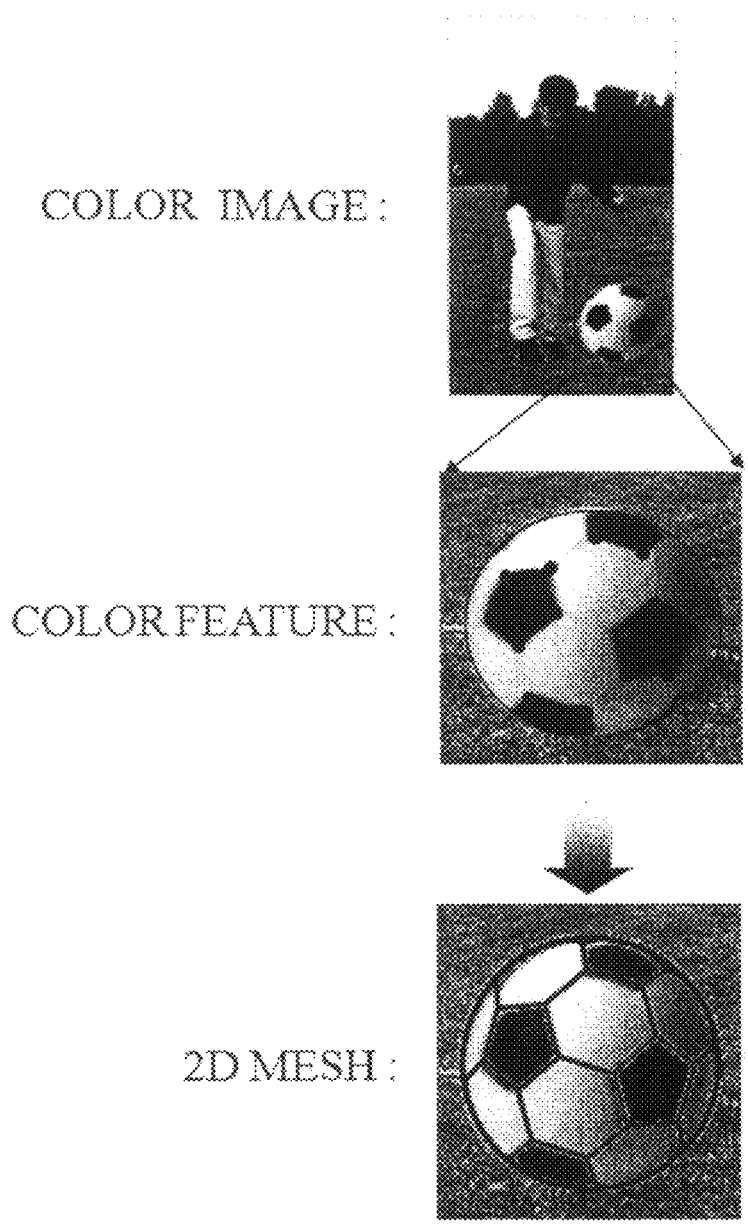
FIG. 2 illustrates an example of a color image processed by a first processor.

The color feature extractor 111 may extract a feature of the input color image from the input color image. Here, the feature of the color image may be referred to as a color feature. FIG. 2 illustrates an example of a color image processed by the first processor 110. Hereinafter, a soccer ball image in the color image of FIG. 2 will be described as an example.

The color feature extracted by the color feature extractor 111 may include at least one of a corner, an edge, and a gradient of the color image. For example, the color feature extractor 111 may extract, as the feature of the color image, at least one gradient among a gradient of a corner of the color image, and a gradient of an edge of the color image. Referring to FIG. 2, extracted color features are represented by bold solid lines or dots.

The 2D vertex generator 113 may analyze the extracted color feature, and may generate 2D vertexes. For example, the 2D vertex generator 113 may set as a 2D vertex, a pixel corresponding to a gradient that is greater than a reference value among the at least one gradient extracted by the color feature extractor 111. Also, the 2D vertex generator 113 may generate 2D vertexes so that an edge formed by the 2D vertexes may be matched to an edge of the color image.

Since a face formed by at least three vertexes is typically defined as a plane, the face may be suitable to represent a uniform area of a color image. Accordingly, pixels of a corner or an edge where color distribution of the color image is radically changed may be used as vertexes. In other words, the pixels of the corner or the edge may have a gradient that is greater than a reference value among a gradient of the corner and a gradient of the edge. The color distribution may be a distribution of R, G, and B values of the pixels, and a distribution of a depth image that will be described below may be a distribution of depth values. Since the color image does not have a depth value, 2D vertexes represented by x and y coordinates may be used as vertexes of the color image.

Figure 3:
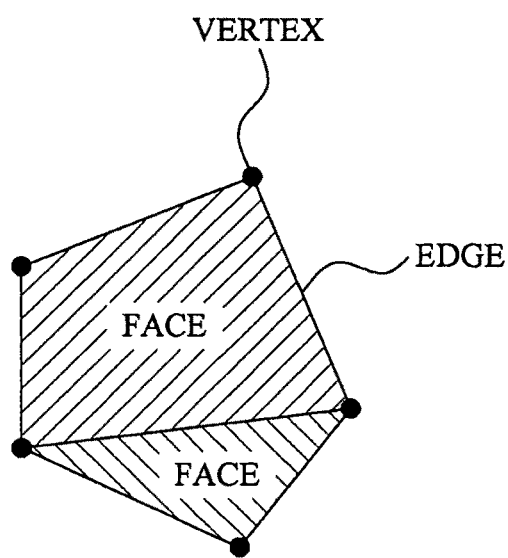
FIG. 3 illustrates components of a mesh according to example embodiments.

FIG. 3 illustrates components of a mesh according to example embodiments.

Generally, a mesh refers to a collection of polyhedrons representing surfaces of a 3D object. The mesh may include vertexes used to define a shape of each polyhedron, edges used to represent lines of each polyhedron, and a face formed by at least three vertexes. The face may be a minimum unit used to represent a uniform area of a color image. As described above, since the color image does not have a depth value, a mesh of the color image may be called a 2D mesh.

Additionally, a 3D mesh may be generated simultaneously using a color image and a depth image. However, when the color image and the depth image have different resolutions and are seen from different viewpoints, pixels not having any color value and depth value may exist. Accordingly, the mesh generating apparatus 100 may first generate a 2D mesh that more accurately represents a color image with a high resolution and may generate a 3D mesh by adding depth information.

Specifically, the 2D mesh generator 115 may connect 2D vertexes, and may generate a 2D mesh. The 2D mesh generator 115 may connect the 2D vertexes based on a color system or a color distribution, to generate a plurality of faces. The 2D mesh generator 115 may connect the 2D vertexes so that pixels having a same color system may represent a single face, and may generate the plurality of faces.

When vertexes are used, a considerable number of faces may be generated by connecting edges, as shown in FIG. 3. However, when edges of a face are orthogonal to a color gradient direction, color may be more accurately represented. Accordingly, the 2D mesh generator 115 may generate a relatively small number of faces using a color gradient when connecting 2D vertexes.

Additionally, the 2D mesh generator 115 may generate a 2D mesh, and edges of the color image may be matched to edges of the 2D mesh. As a result, the 2D mesh may be generated by connecting the 2D vertexes, and a number of faces forming the 2D mesh may be minimized.

As described above, a face may be a minimum unit used to represent a uniform area of a color image. Accordingly, when colors are not evenly distributed on a single face, the 2D mesh generator 115 may add a new 2D vertex to the face, to divide the face, so that the colors may be evenly distributed on the face. This is because it is difficult to represent a 2D mesh on a 3D plane as a result of an uneven color distribution.

A location of the added 2D vertex may be indicated by a coordinate of a pixel that minimizes an error, when a color distribution in a plurality of faces is represented on a 3D plane. Since a 2D mesh typically includes a face shaped in a plane, a predetermined pixel in the face may satisfy a plane equation. When a part of a color image is formed of a face, and when a distribution of colors, for example R, G, and B values or gray values satisfies the plane equation errors may be reduced. The plane equation may include x and y coordinates, and a color value z of an image.

The second processor 120 may generate 3D vertexes from an input depth image. To generate the 3D vertexes, the second processor 120 may include a depth feature extractor 121, and a 3D vertex generator 123.

Figure 4:
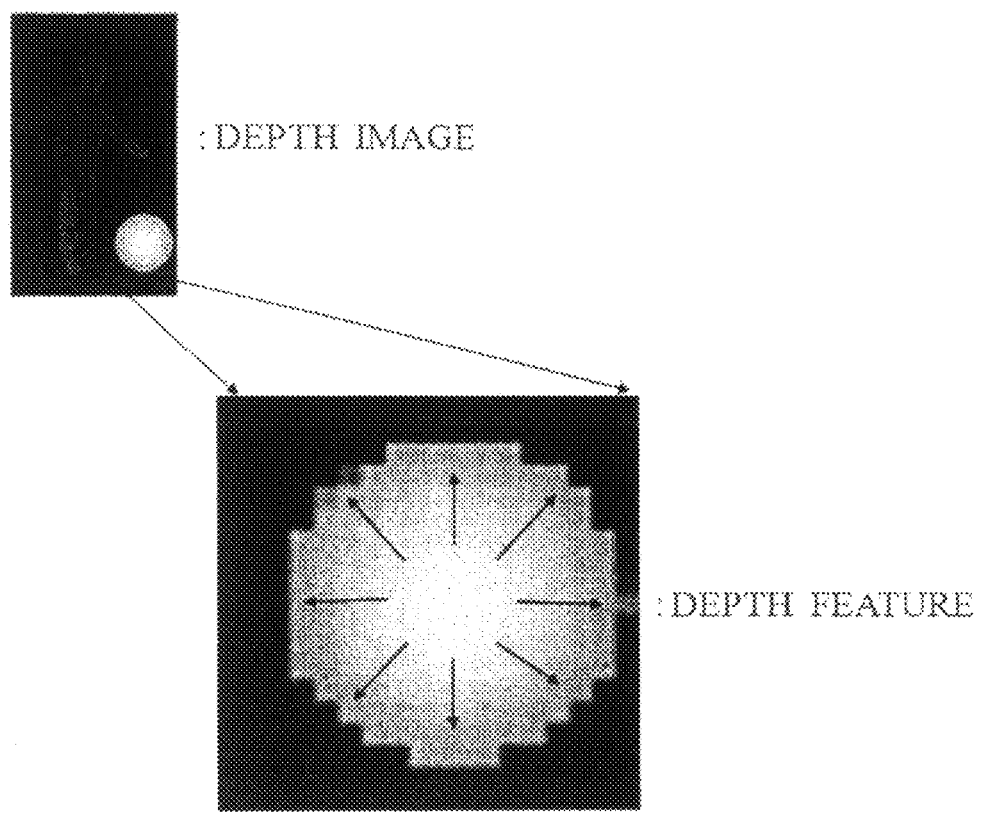
FIG. 4 illustrates an example of a depth image processed by a second processor according to example embodiments.

The depth feature extractor 121 may extract a feature from the input depth image. Here, the feature of the depth image may be referred to as a depth feature. FIG. 4 illustrates an example of a depth image processed by the second processor 120. Hereinafter, a soccer ball image in the depth image of FIG. 4 will be described as an example.

The depth feature extracted by the depth feature extractor 121 may include at least one of a corner, an edge, and a curvature of the depth image, a normal vector, and a gradient of all pixels of the depth image. For example, the depth feature extractor 121 may extract, as a feature of the depth image, at least one gradient of a gradient of a corner of the depth image, a gradient of an edge of the depth image, and a gradient of a curvature of the depth image.

The 3D vertex generator 123 may analyze the extracted depth feature, and may generate 3D vertexes. For example, the 3D vertex generator 123 may set, as a 3D vertex, a pixel corresponding to a gradient that is greater than a reference value among the at least one gradient extracted by the depth feature extractor 121. An operation of the 3D vertex generator 123 may be substantially similar to an operation of the 2D vertex generator 113, and accordingly, a further description thereof will be omitted herein. However, since the depth image has a depth value, vertexes of the depth image may be 3D vertexes represented by x, y, and z coordinates. Additionally, the 3D vertex generator 123 may generate 3D vertexes, and an edge formed by 3D vertexes may be matched to an edge of the depth image.

It may be difficult to sufficiently represent the input color image and the input depth image using the 2D vertexes and the 3D vertexes that are generated using the gradients of the input color image and the gradients of the depth image, respectively. Accordingly, the 3D mesh generator 130 that will be described below may perform interpolation to additionally acquire required information.

Alternatively, since a resolution of a depth image is relatively lower than a resolution of a color image, the second processor 120 may use all pixels of the depth image as 3D vertexes.

Figure 5:
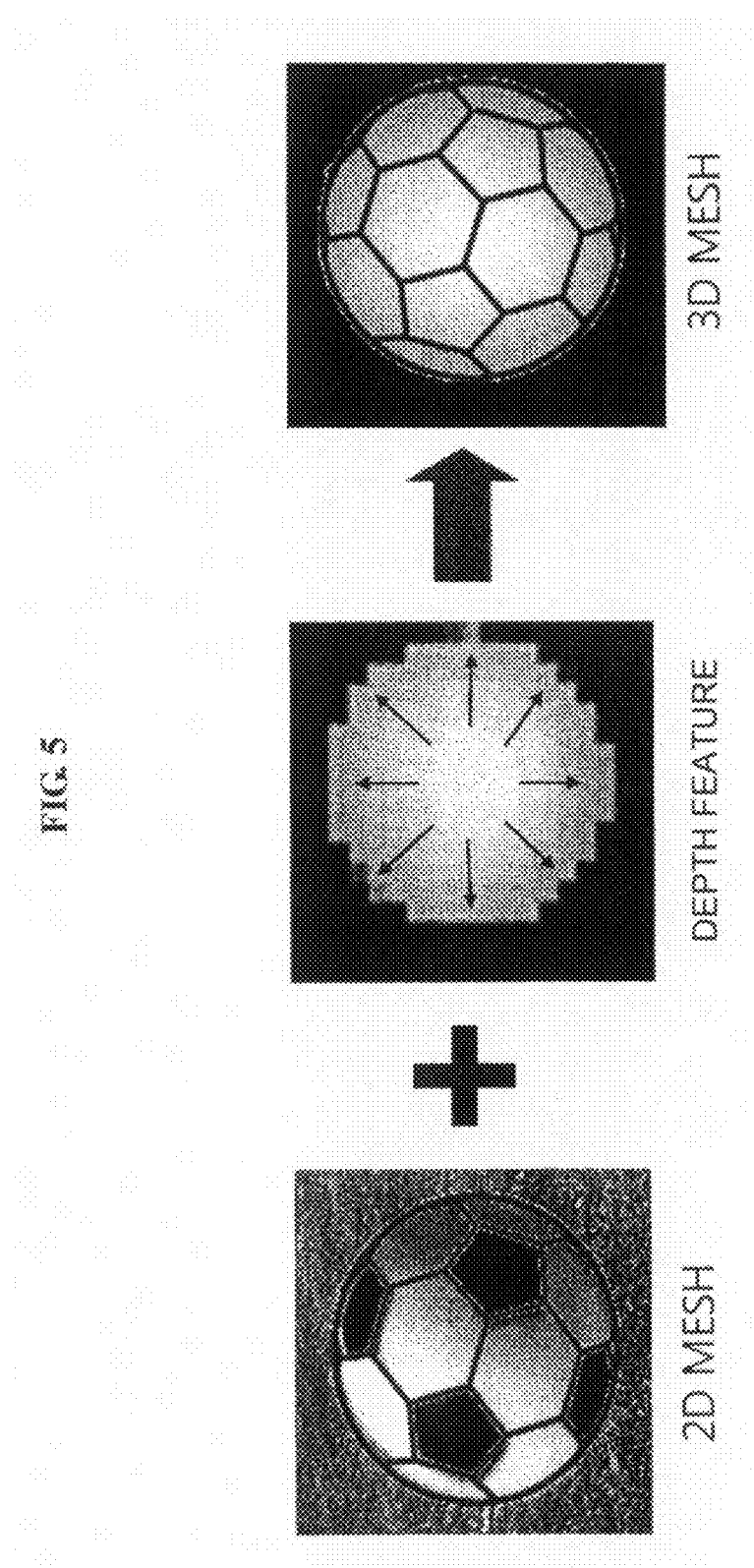
FIG. 5 illustrates an example of generating a three-dimensional (3D) mesh according to example embodiments.

FIG. 5 illustrates an example of generating a 3D mesh according to example embodiments.

Referring to FIG. 5, the 3D mesh generator 130 may match the 2D mesh generated by the 2D mesh generator 115 with the 3D vertexes generated by the 3D vertex generator 123, and may generate a 3D mesh. For example, the 3D mesh generator 130 may add depth values of the 3D vertexes to the 2D vertexes of the 2D mesh, to generate a 3D mesh.

To generate a 3D mesh by adding depth values of the 3D vertexes to the 2D mesh based on a color image, the 3D mesh generator 130 may match viewpoints of the color image and the depth image using a camera calibration scheme, and the like. Specifically, the 3D mesh generator 130 may match an image formed by 3D vertexes to a viewpoint of the 2D mesh, to generate 3D vertexes. Accordingly, x and y coordinates of the depth image may be equal to pixel coordinates of the color image. In other words, x and y coordinates of the 3D vertexes may be equal to pixel coordinates of the 2D mesh. 3D vertexes having viewpoints which are changed by the camera calibration scheme may be inpainted to original x, y, and z coordinates. Such an operation of matching viewpoints may not be performed, when a color image and a depth image are acquired by a single lens and a single sensor.

Alternatively, to match viewpoints, viewpoints of the color image and the depth image may be calibrated using the camera calibration scheme, and the color image and the depth image having the calibrated viewpoints may be input to the first processor 110 and the second processor 120, respectively.

Since the depth image has a relatively low resolution compared with the color image as described above, the depth values of the 3D vertexes may not be added to a portion of the 2D vertexes of the 2D mesh. To add the depth values to all of the 2D vertexes, the 3D mesh generator 130 may interpolate the depth values using the depth image to solve a resolution difference problem. In other words, the 3D mesh generator 130 may interpolate a depth value using the 3D vertexes, and the depth value may be added to a 2D vertex where the depth value is not added among the 2D vertexes.

To perform the interpolation, it is assumed that a face of a 2D mesh with an even color distribution has a uniform depth value. Additionally, the 3D mesh generator 130 may add to all pixels of the face, a depth value added to a single pixel of the face. Thus, when different depth values are added to a plurality of pixels in a single face, the 3D mesh generator 130 may adjust the depth values based on a color distribution of the plurality of pixels.

Alternatively, the 3D mesh generator 130 may diffuse depth values that are partially input to a single face, using a face and an edge that have a similar color distribution, and may generate a 3D mesh having a depth value, as shown in FIG. 5. Thus, it is possible to increase the resolution of the depth image based on color information.

Figure 6:
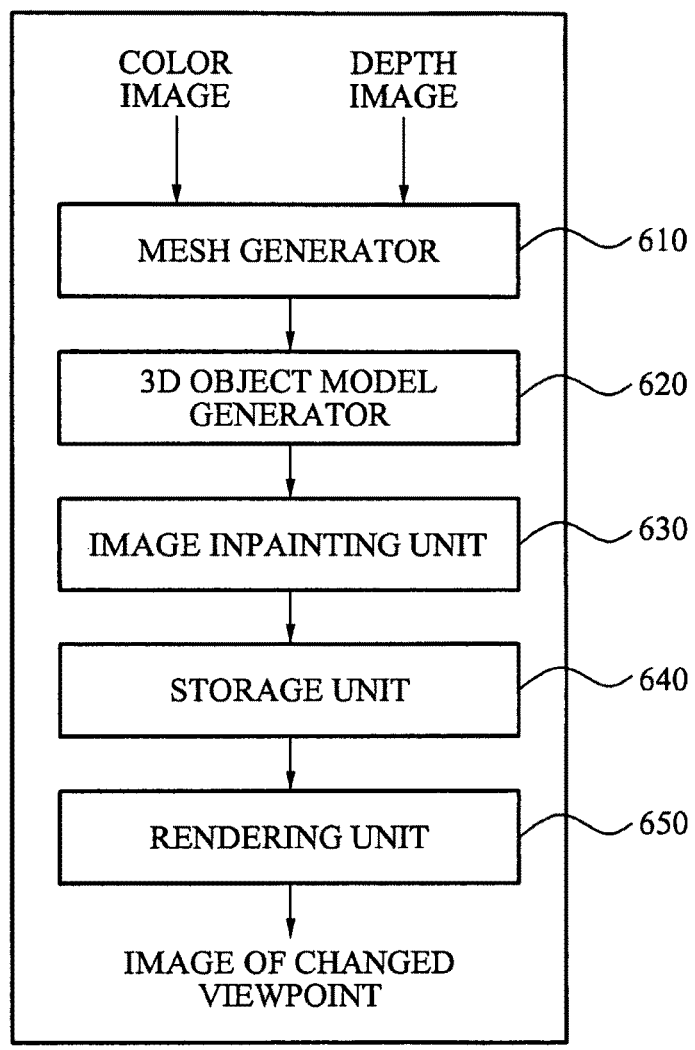
FIG. 6 illustrates a block diagram of an image processing apparatus according to example embodiments.

FIG. 6 illustrates a block diagram of an image processing apparatus 600 according to example embodiments.

Referring to FIG. 6, the image processing apparatus 600 includes a mesh generator 610, a 3D object model generator 620, an image inpainting unit 630, a storage unit 640, and a rendering unit 650.

The mesh generator 610 may generate a 3D mesh using 2D vertexes of an input color image and 3D vertexes of an input depth image. The mesh generator 610 of FIG. 6 may be implemented by the mesh generating apparatus 100 described above with reference to FIGS. 1 through 5, and accordingly, a further description of the mesh generator 610 will be omitted herein.

The 3D object model generator 620 may generate a 3D object model based on the 3D mesh generated by the mesh generator 610 and the input color image. The input color image may be used as a texture of the 3D object model. The texture may be information other than geometry information, and may be used together with the geometry information to generate a 3D object model. The information other than the geometry information may include, for example, surface information, color information, and the like, and the geometry information may include, for example, information about a 3D mesh.

Figure 7:
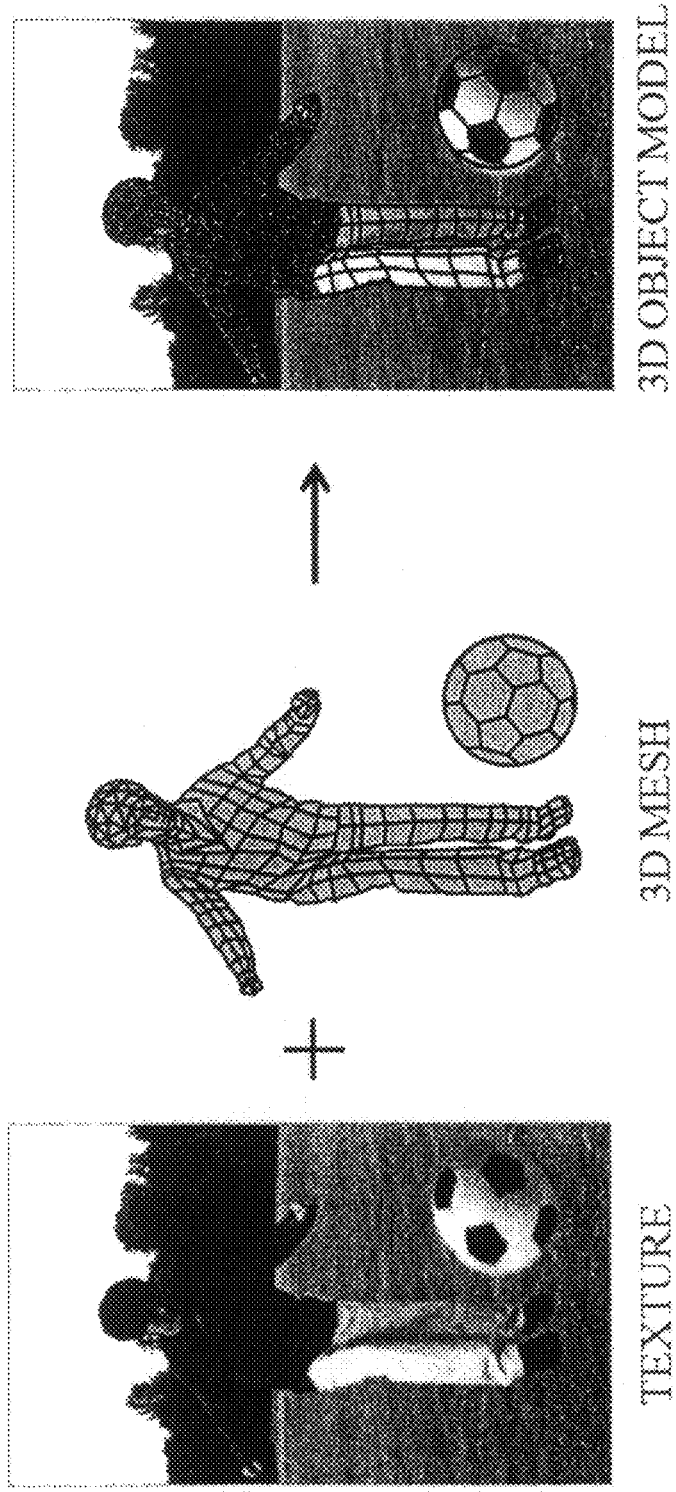
FIG. 7 illustrates an example of a 3D object model generated by a 3D object model generator according to example embodiments.

FIG. 7 illustrates an example of the 3D object model generated by the 3D object model generator 620. x and y coordinates of an input color image may be used as x and y coordinates of a 3D mesh generated by the 3D mesh generator 130. Accordingly, the 3D object model generator 620 may use the input color image as a texture of the 3D object model, as shown in FIG. 7. The 3D object model generator 620 may perform rendering on the 3D mesh and the texture using graphic hardware, and may generate a 3D object model. The graphic hardware may support a rasterization operation.

Figure 8:
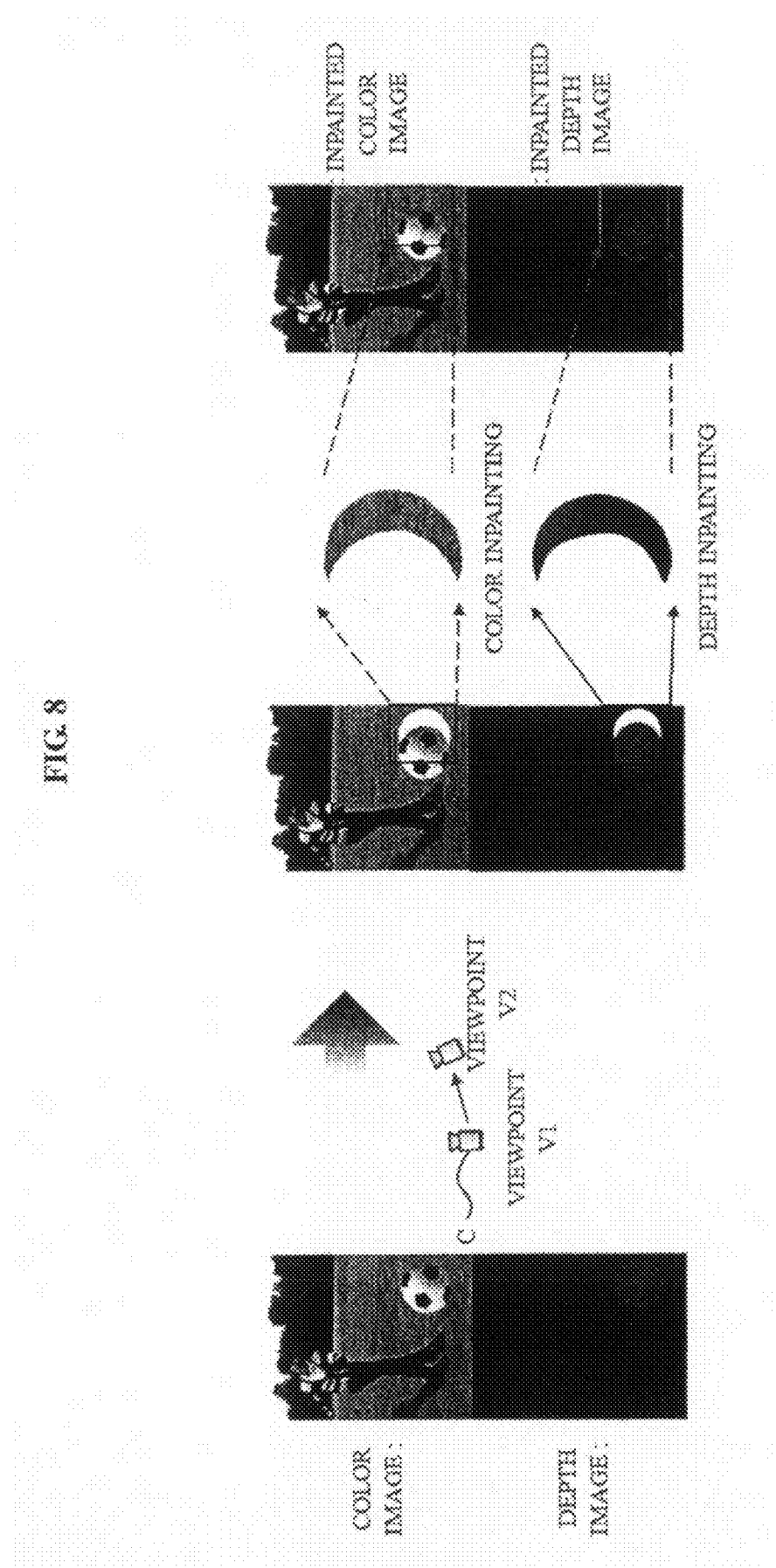
FIG. 8 illustrates an example of inpainting occlusion areas according to example embodiments.

The image inpainting unit 630 may inpaint an occlusion area that occurs in the 3D object model by a change in viewpoint of a virtual camera. FIG. 8 illustrates an example of inpainting occlusion areas according to example embodiments. Referring to FIG. 8, a color image and a depth image may be captured from a viewpoint V1 of a virtual camera C.

When the viewpoint V1 is changed to a viewpoint V2, occlusion areas may appear in the color image and the depth image. In FIG. 8, the occlusion areas are indicated by white areas adjacent to soccer ball images in the color image and the depth image. The image inpainting unit 630 may inpaint the occlusion areas using neighboring areas in the color image and the depth image, and the color image and the depth image may be inpainted. Additionally, the image inpainting unit 630 may generate, in advance, occlusion areas based on a change in a plurality of viewpoints, and may store the generated occlusion areas in the storage unit 640.

The storage unit 640 may map data of the occlusion areas inpainted by the image inpainting unit 630 to a corresponding viewpoint, and may store the mapped data.

Figure 9:
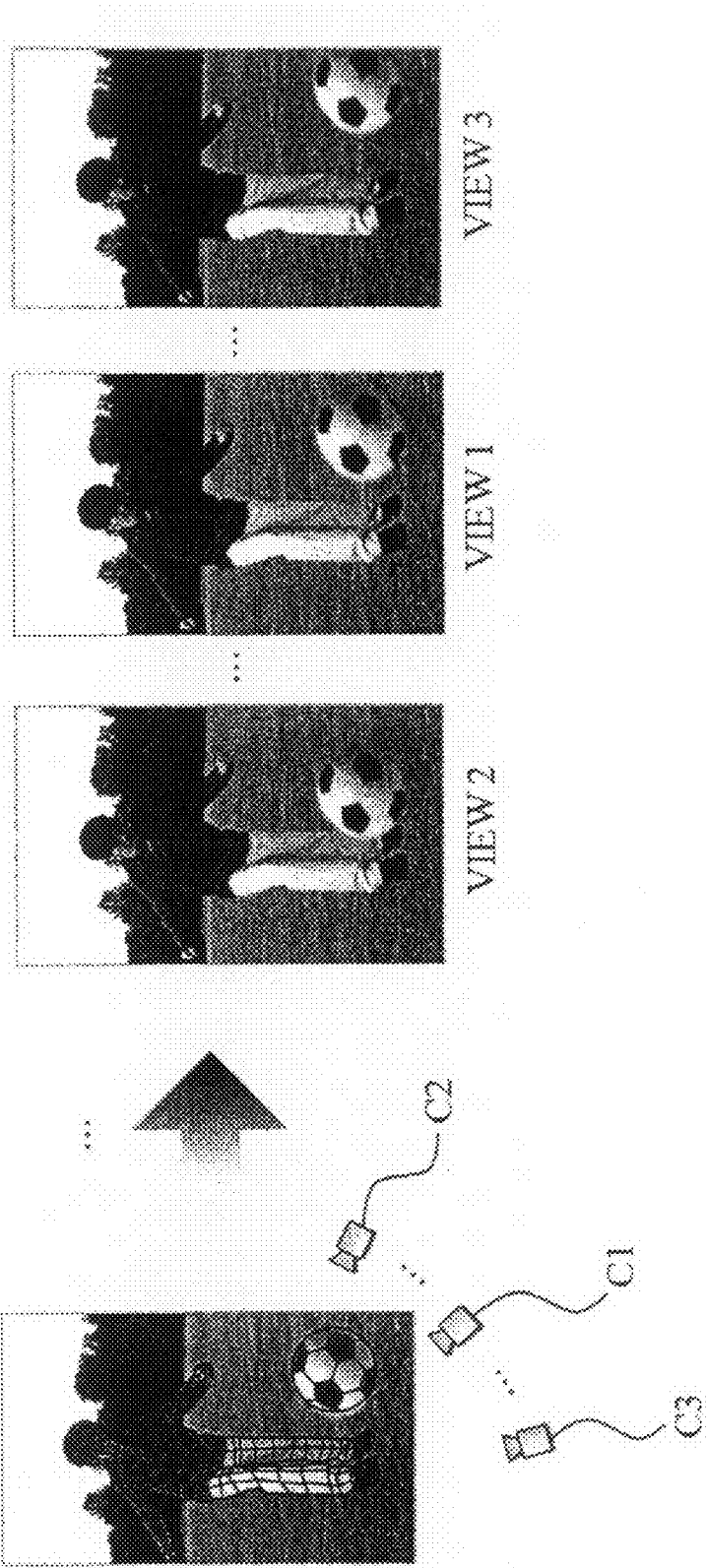
FIG. 9 illustrates examples of images seen from different viewpoints according to example embodiments.

The rendering unit 650 may generate an image corresponding to a view from a viewpoint of a virtual camera using the generated 3D object model and the inpainted occlusion areas, when the viewpoint of the virtual camera is selected. FIG. 9 illustrates examples of images seen from different viewpoints according to example embodiments. Referring to FIG. 9, a viewpoint image view 1 represents a 3D object model seen from a viewpoint of a virtual camera C1. To generate a viewpoint image view 2 without occlusion areas, the rendering unit 650 may perform rendering on the generated 3D object model and the inpainted occlusion areas. A viewpoint image view 3 may be seen from a viewpoint of a virtual camera C3.

Figure 10:
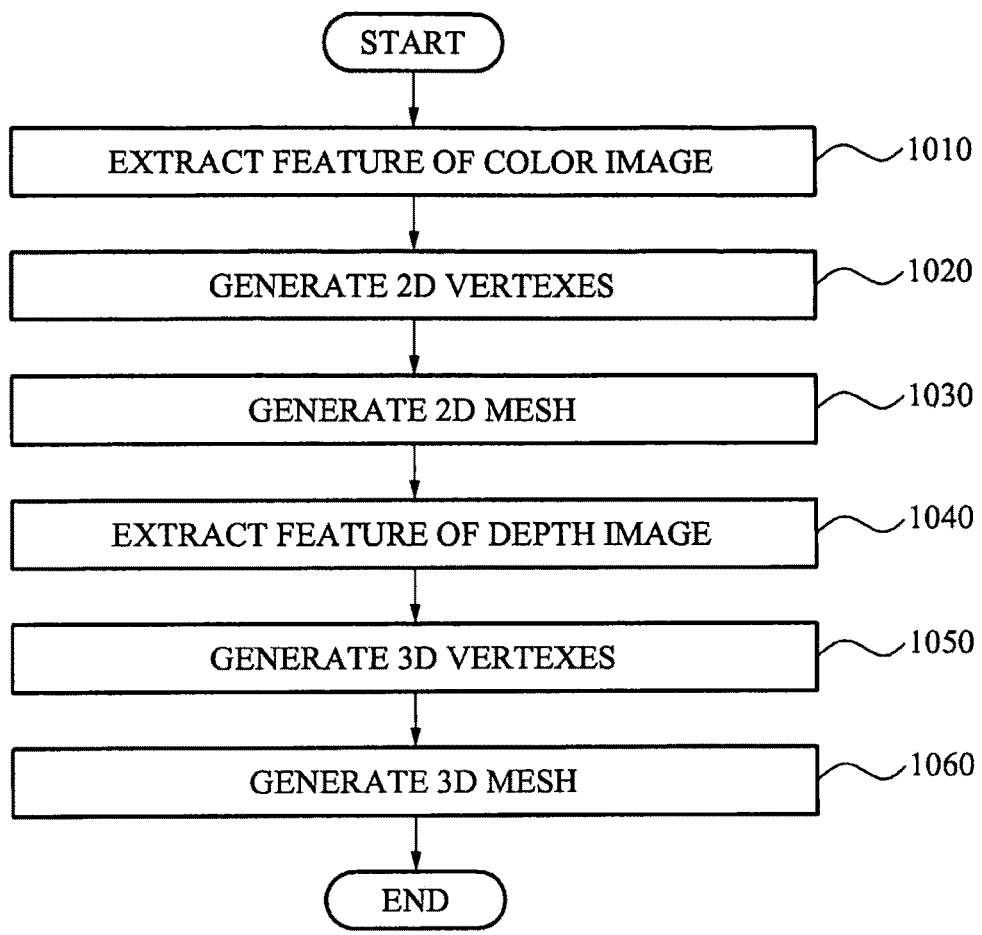
FIG. 10 illustrates a flowchart of a mesh generating method of a mesh generating apparatus according to example embodiments.

FIG. 10 illustrates a flowchart of a mesh generating method of a mesh generating apparatus according to example embodiments.

The mesh generating method of FIG. 10 may be performed by the mesh generating apparatus 100 of FIG. 1.

In operation 1010, the mesh generating apparatus may extract a color feature from an input color image. The extracted color feature may include at least one of a corner, an edge and a gradient of the input color image.

In operation 1020, the mesh generating apparatus may analyze the extracted color feature, and may generate 2D vertexes.

In operation 1030, the mesh generating apparatus may connect the 2D vertexes generated in operation 1020, and may generate a 2D mesh. Specifically, the mesh generating apparatus may connect the 2D vertexes and pixels having a same color system may represent a single face, and may generate a plurality of faces.

In operation 1040, the mesh generating apparatus may extract a depth feature of an input depth image from the input depth image. The extracted depth feature may include at least one of a corner, an edge, and a curvature of the depth image, a normal vector, and a gradient of all pixels of the depth image.

In operation 1050, the mesh generating apparatus may analyze the extracted depth feature, and may generate 3D vertexes. Operations 1010 and 1040 may be performed simultaneously, and operations 1020 and 1050 may also be performed simultaneously.

In operation 1060, the mesh generating apparatus may match the 2D mesh generated in operation 1030 with the 3D vertexes generated in operation 1050, and may generate a 3D mesh. For example, the mesh generating apparatus may add depth values of the 3D vertexes to the 2D vertexes of the 2D mesh to generate a 3D mesh.

Figure 11:
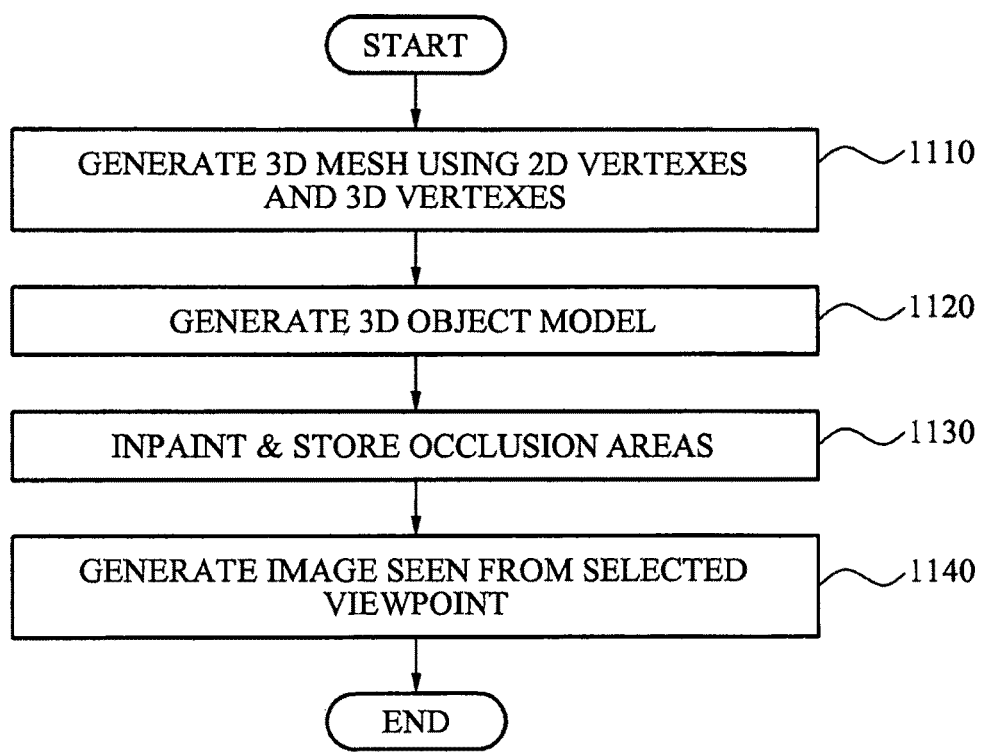
FIG. 11 illustrates a flowchart of an image processing method of an image processing apparatus according to example embodiments.

FIG. 11 illustrates a flowchart of an image processing method of an image processing apparatus according to example embodiments.

The image processing method of FIG. 11 may be performed by the image processing apparatus 600 of FIG. 6.

In operation 1110, the image processing apparatus may generate a 3D mesh using 2D vertexes of an input color image and 3D vertexes of an input depth image. Operation 1110 has been described in the mesh generating method of FIG. 10, and accordingly, a further description thereof will be omitted herein.

In operation 1120, the image processing apparatus may generate a 3D object model based on the 3D mesh generated in operation 1110 and the color image.

In operation 1130, the image processing apparatus may inpaint occlusion areas of the 3D object model, and may store the 3D object model having inpainted occlusion areas. The occlusion areas may appear on the 3D object model as a result of a change in a viewpoint of a virtual camera. The image processing apparatus may inpaint occlusion areas appearing by various viewpoints, data of the inpainted occlusion areas may be mapped to the viewpoints and the mapped data may be stored.

In operation 1140, the image processing apparatus may generate an image corresponding to a view from a viewpoint of the virtual camera using the stored 3D object model and the inpainted occlusion areas when the viewpoint of the virtual camera is selected.

In the mesh generating apparatus 100 and the mesh generating method thereof as described above, a 3D mesh may be generated using a single color image and a single depth image. In the image processing apparatus 600 and the image processing method thereof, a single 3D object model may be generated using a single color image and a single depth image, and a plurality of viewpoint images may be generated using a single 3D object model.

Additionally, in the mesh generating apparatus 100 and the mesh generating method thereof, and the image processing apparatus 600 and the image processing method thereof, 2D vertexes may be generated and an edge formed by the 2D vertexes may be matched to an edge of a depth image. 3D vertexes may also be generated and an edge formed by the 3D vertexes may be matched to an edge of a depth image. Accordingly, edges generated by a combination of the 2D vertexes and the 3D vertexes may be identical to edges of a color image and a depth image. Thus, it is possible to generate a more realistic 3D mesh.

Furthermore, the mesh generating apparatus 100 and the mesh generating method thereof, and the image processing apparatus 600 and the image processing method thereof may be easily used to generate a stereo image or a multi-view image that may be used in a stereoscopic or an auto-stereoscopic 3D display, as well as to generate a multi-view image that may be used in a next generation 3D display.

The above-described embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may be a plurality of computer-readable storage devices in a distributed network, so that the program instructions are stored in the plurality of computer-readable storage devices and executed in a distributed fashion. The program instructions may be executed by one or more processors or processing devices. The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although embodiments have been shown and described, it should be appreciated by those skilled in the art that changes may be made in these embodiments without departing from the principles and spirit of the disclosure, the scope of which is defined in the claims and their equivalents.

What is claimed is:

1. An image processing apparatus, comprising:
   a mesh generator to generate a three-dimensional (3D) mesh using two-dimensional (2D) vertexes of an input color image and 3D vertexes of an input depth image; and
   a 3D object model generator to generate a 3D object model based on the 3D mesh and the input color image,
   wherein the input color image is used as a texture of 3D object model.

2. The image processing apparatus of claim 1, wherein the mesh generator comprises:
   a first processor to generate 2D vertexes from the color image and to generate a 2D mesh using the generated 2D vertexes;
   a second processor to generate 3D vertexes from the depth image; and
   a 3D mesh generator to match the 2D mesh with the 3D vertexes and to generate a 3D mesh.

3. The image processing apparatus of claim 2, wherein the first processor comprises:
   a color feature extractor to extract a feature from the color image;
   a 2D vertex generator to analyze the extracted feature and to generate the 2D vertexes; and
   a 2D mesh generator to connect the generated 2D vertexes and to generate the 2D mesh.

4. The image processing apparatus of claim 3, wherein the color feature extractor extracts, as the feature of the color image, at least one gradient of a gradient of a corner of the color image, and a gradient of an edge of the color image, and
   wherein the 2D vertex generator sets, as a 2D vertex, a pixel corresponding to a gradient that is greater than a reference value among the extracted at least one gradient.

5. The image processing apparatus of claim 3, wherein the 2D mesh generator connects the generated 2D vertexes so that pixels having a same color system represent a face, and generates the 2D mesh.

6. The image processing apparatus of claim 2, wherein the second processor comprises:
   a depth feature extractor to extract a feature from the depth image; and
   a 3D vertex generator to analyze the extracted feature and to generate the 3D vertexes.

7. The image processing apparatus of claim 6, wherein the depth feature extractor extracts, as the feature of the depth image, at least one gradient of a gradient of a corner of the depth image, a gradient of an edge of the depth image, and a gradient of a curvature of the depth image, and
   wherein the 3D vertex generator sets, as a 3D vertex, a pixel corresponding to a gradient that is greater than a reference value among the extracted at least one gradient.

8. The image processing apparatus of claim 2, wherein the second processor sets all pixels of the depth image as the 3D vertexes.

9. The image processing apparatus of claim 2, wherein the 3D mesh generator adds depth values of the 3D vertexes to the 2D vertexes of the 2D mesh and generates the 3D mesh.

10. The image processing apparatus of claim 9, wherein, when the depth values of the 3D vertexes are not added to a 2D vertex among the 2D vertexes of the 2D mesh, the 3D mesh generator interpolates a depth value to be added to the 2D vertex, using the generated 3D vertexes.

11. The image processing apparatus of claim 1, further comprising:
   an image inpainting unit to inpaint occlusion areas, the occlusion areas generated in the generated 3D object model by a change in a viewpoint of a virtual camera.

12. The image processing apparatus of claim 11, further comprising:
   a rendering unit to generate an image corresponding to a view from a viewpoint of the virtual camera using the generated 3D object model and the inpainted occlusion areas when the viewpoint of the virtual camera is selected.

13. A mesh generating apparatus, comprising:
a first processor to generate two-dimensional (2D) vertexes from an input color image, and to generate a 2D mesh using the generated 2D vertexes;
a second processor to generate three-dimensional (3D) vertexes from an input depth image; and
a 3D mesh generator to match the 2D mesh with the 3D vertexes and to generate a 3D mesh.

14. An image processing method, comprising:
generating, by at least one processor, a three-dimensional (3D) mesh using two-dimensional (2D) vertexes of an input color image and 3D vertexes of an input depth image; and
generating, by the at least one processor, a 3D object model based on the 3D mesh and the input color image,
wherein the input color image is used as a texture of the 3D object model.

15. The image processing method of claim 14, wherein the generating of the 3D mesh comprises:
generating 2D vertexes from the input color image, and generating a 2D mesh using the generated 2D vertexes;
generating 3D vertexes from the input depth image; and
matching the 2D mesh with the 3D vertexes, and generating a 3D mesh.

16. The image processing method of claim 15, wherein the generating of the 2D mesh comprises:
extracting a feature from the color image;
analyzing the extracted feature and generating the 2D vertexes; and
connecting the generated 2D vertexes and generating the 2D mesh.

17. The image processing method of claim 16, wherein the extracting of the feature comprises extracting, as the feature of the color image, at least one gradient of a gradient of a corner of the color image, and a gradient of an edge of the color image, and
wherein the generating of the 2D vertexes comprises setting, as a 2D vertex, a pixel corresponding to a gradient that is greater than a reference value among the extracted at least one gradient.

18. The image processing method of claim 16, wherein the connecting of the 2D vertexes comprises connecting the generated 2D vertexes causing pixels having a same color system to represent a face and generating the 2D mesh.

19. The image processing method of claim 15, wherein the generating of the 3D vertexes comprises:
extracting a feature from the depth image; and
analyzing the extracted feature and generating the 3D vertexes.

20. The image processing method of claim 19, wherein the extracting of the feature comprises extracting, as the feature of the depth image, at least one gradient among a gradient of a corner of the depth image, a gradient of an edge of the depth image, and a gradient of a curvature of the depth image, and
wherein the analyzing of the extracted feature comprises setting, as a 3D vertex, a pixel corresponding to a gradient that is greater than a reference value among the extracted at least one gradient.

21. The image processing method of claim 15, wherein the generating of the 3D mesh comprises adding depth values of the 3D vertexes to the 2D vertexes of the 2D mesh and generating the 3D mesh.

22. The image processing method of claim 14, further comprising:
inpainting occlusion areas, the occlusion areas generated in the generated 3D object model by a change in a viewpoint of a virtual camera.

23. The image processing method of claim 22, further comprising:
generating an image corresponding to a view from a viewpoint of the virtual camera using the generated 3D object model and the inpainted occlusion areas when the viewpoint of the virtual camera is selected.

24. A mesh generating method, comprising:
generating, by at least one processor, two-dimensional (2D) vertexes from an input color image, and generating a 2D mesh using the generated 2D vertexes;
generating, by the at least one processor, three-dimensional (3D) vertexes from an input depth image; and
matching, by the at least one processor, the 2D mesh with the 3D vertexes and generating a 3D mesh.

25. At least one non-transitory computer readable recording medium comprising computer readable instructions that control at least one processor to implement a method, comprising:
generating a three-dimensional (3D) mesh using two-dimensional (2D) vertexes of an input color image and 3D vertexes of an input depth image; and
generating a 3D object model based on the 3D mesh and the input color image,
wherein the input color image is used as a texture of the 3D object model.

26. A method, comprising:
generating, by at least one processor, a multi-view image, the multi-view image generated by a method, comprising:
generating a three-dimensional (3D) mesh using two-dimensional (2D) vertexes of an input color image and 3D vertexes of an input depth image and generating a 3D object model based on the 3D mesh and the input color image, wherein the input color image is used as a texture of the 3D object model,
inpainting occlusion areas, the occlusion areas generated in the generated 3D object model by changes in a viewpoint of a virtual camera, and
generating the multi-view image corresponding to multiple views from the changes in the viewpoint of the virtual camera using the generated 3D object model and the inpainted occlusion areas.

27. A method, comprising:
processing, by at least one processor, an image, by extracting color information to form a two-dimensional mesh within the image;
processing, by the at least one processor, the image, by adding depth features to the image responsive to the extracted color information; and
determining, by the at least one processor, a three-dimensional mesh based on the two- dimensional mesh and the depth features to build a three-dimensional object, the three-dimensional object appearing differently from multiple viewpoints based on inpainted occlusion areas.

* * * * *